United States Patent [19]

Dreyer et al.

[11] 4,003,665

[45] Jan. 18, 1977

[54] METHOD FOR THE MANUFACTURE OF WRITING INSTRUMENTS

[75] Inventors: Hans Dreyer, Oberentfelden; Roman Etter, Rombach, both of Switzerland

[73] Assignee: Kern & Co. AG, Aarau, Switzerland

[22] Filed: Mar. 20, 1975

[21] Appl. No.: 560,216

[30] Foreign Application Priority Data

Mar. 28, 1974 Switzerland .................. 4375/74

[52] U.S. Cl. .................................. 401/259; 29/520; 156/73.1; 156/294; 228/1 R; 228/110; 228/262; 264/69; 264/249

[51] Int. Cl.² .......................................... B32B 31/22

[58] Field of Search ............... 156/73.1, 73.2, 294; 264/69, 249; 228/2, 1, 110, 111, 262; 29/520, 474.3; 401/198, 209, 199, 216, 265, 259

[56] References Cited

UNITED STATES PATENTS

| 3,436,803 | 4/1969 | Sarnoff .................... 264; 249 |
|---|---|---|
| 3,455,639 | 7/1969 | Danjczek ..................... 401/259 |
| 3,512,897 | 5/1970 | Riepe .......................... 401/259 |
| 3,705,380 | 12/1972 | Roberts et al. ................ 264/249 |
| 3,728,184 | 4/1973 | Burke et al. .................. 156/73.1 |
| 3,739,468 | 6/1973 | Hill ............................. 156/73.1 |
| 3,836,062 | 9/1974 | Tsunoda et al. ............... 156; 73.1 |

*Primary Examiner*—Edward G. Whitby

[57] ABSTRACT

A stylus is assembled from a plastic tip having an axial bore and an ink tube in said bore centered therein and welded thereto. Ultrasonic welding is used for softening and partially melting the tip. On switching off the ultrasonic energy source, the molten portion of the tip hardens and provides a strong bond between the tip and the ink tube.

14 Claims, 6 Drawing Figures

METHOD FOR THE MANUFACTURE OF WRITING INSTRUMENTS

BACKGROUND OF THE INVENTION

The present invention relates to the construction of styli used for writing or drawing purposes and in particular to the method of inserting the small ink tube in the point of a tubular stylus, the writing or drawing ink tube being inserted, centered and fastened with the assistance of an assembly tool within an aperture in the stylus.

Various methods are known providing for securing small ink tubes in the tips or points of the stylus. According to the known methods, the ink tubes are either glued or press fit into the bore of a finished plastic tip. Also it is known to place the tubes in a spraying or molding device and then cover them with plastic. In another method, the ink tubes have been glued or pressed into plastic tips which are themselves surrounded by metal casings.

All the mentioned methods have considerable drawbacks and difficulties in that they either take considerable time for glueing and permit only limited adhesive bonding and poor stability of the small ink tube when press fit into the plastic. Satisfactory adhesive action is obtained only under compression with both the bore in the point and the diameter of the pressfit portion of the small ink tube are perfectly matched in diameter to provide a uniform press fit for all tubes in a manufactured set.

For this reason, both the ink tubes and the tips must be made precisely to secure the necessary fastening connection. This involves an expensive operation. Another disadvantage arises from the pressing of ink tubes into bores of plastic tips. Under such conditions, they are exposed to a considerable degree of tension and stress. As a result, the adhesive bond, under changing climatic conditions breaks down. In this way the tube becomes loose from the tip and can no longer perform its function.

Where the ink tube is provided with an adhesive layer or coating sprayed or extruded thereonto, a complicated device must be used for securing the ink tube position during the spraying operation. This involves the danger that the writing area of the tube would suffer damage to become a waste product.

Both the process for glueing and pressing ink tubes into metal casings have the drawback that the casings and the press fit portion must be manufactured with a great deal of precision. Besides, where the fastening or fixation of the ink tubes is performed by glueing, a time consuming cleansing must follow the glueing operation, which by itself is sensitive and hard to control.

It is the object of the present invention to provide a method for forming writing instruments of the type described which overcome the disadvantages of the prior art.

It is another object of the present invention to provide a simple, economical process for forming writing instruments of the type described.

It is still another object of the present invention to provide a method for forming writing instruments of the type described which avoid the disadvantages of glueing, press fitting or plastic molding by providing for the bonding to be obtained by ultrasonic energy.

It is another object of the present invention to provide a method of mounting said tubes into said casings and tips in a simple and reliable operation connected with less cost and not requiring a precise manufacture of the tubes and/or tips.

Still another object of the present invention is to provide a method of ultrasonically welding the writing ink tubes to writing tips made of a plastic material and attached to casings of styli in order to fasten the tubes to the tips by means of a connection which is free of tension and stress and provides a secure and reliable hold unaffected by various climatic conditions, their changes and/or by pressure accompanying writing or drawing.

These objects and others, together with numerous advantages will be found in the following description.

SUMMARY OF THE INVENTION

According to the present invention, the small ink tube is first loosely inserted in the axial bore of the plastic tip of the stylus and is centered therein by an insertion tool. Thereafter, the contacting point between the ink tube and the plastic tip is subjected to ultrasonic treatment which softens the plastic tip in the area where it contacts the ink tube. While being exposed to the ultrasonic energy, the ink tube is axially shifted to its correct writing operative position. The ultrasonic treatment is thereafter stopped and the molten plastic material is caused to harden welding the ink tube within the plastic tip.

It is the advantage of the present invention that small ink tubes can be positively secured by the use of ultrasonics, without any mechanical stress or strain being created.

According to a further provision of the present invention, one area of contact between the plastic tip and the ink tube may be provided with a peripheral groove whose volume, related to the material mass of the plastic tip, is selected so that there exists in this area a surplus of the plastic material of between 10 and 30%. In this case, the molten plastic material sets inside the peripheral groove and provides a strong interconnection between said ink tube and plastic tip.

Full details of the present invention are set forth in the following disclosure and in the accompanying drawings.

DETAILED DESCRIPTION OF THE INVENTION

FIGS. 1 to 4 illustrate in a greatly enlarged scale an India ink pen stylus having a rotational shape symmetrical about a central axis. The pen is formed of a metal point, or ink tube 1, an outer metal casing 2 and an intermediate plastic tip 3. The tip 3 is made of a plastic material, having a central axial bore 13 in which the ink tube 1 is inserted and is surrounded in its front most tubular portion by the metallic casing 2. This casing is fixed to the plastic tip 3 in an injection molding process. The casing 2 reinforces the plastic tip and serves to fix the ink tube filler or bladder to the stylus or drawing device without damage to the plastic tip 3.

The plastic material of which the tip 3 is made is a thermoplastic material suitable for ultrasonic welding. For example, use may be made of polystyrene resins.

Figure 1:
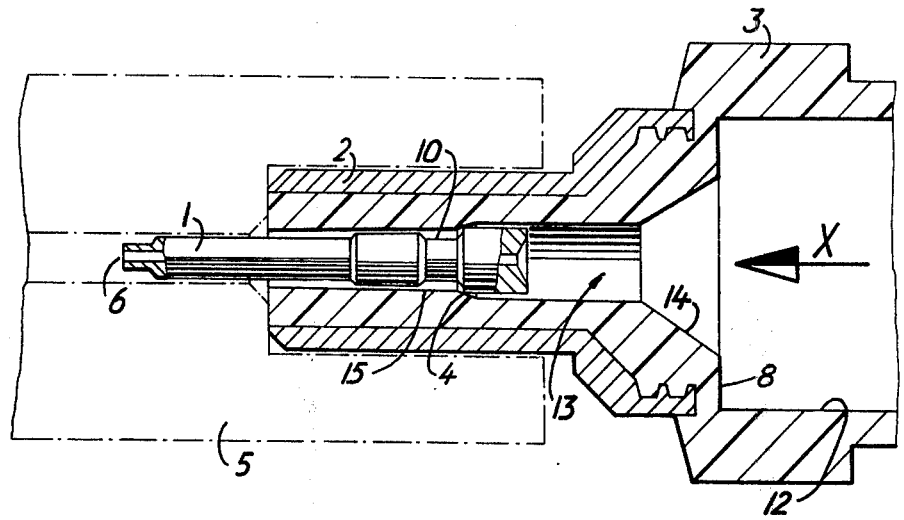
FIG. 1 is an enlarged view in partial longitudinal section of the stylus of an India ink pen with an ink tube freely introduced in the direction of an arrow x into the bore contained in a plastic tip of the stylus.

As seen in FIG. 1, the plastic tip 3 has a large diameter rear portion frontally extending into a smaller diameter section surrounded, to be reinforced, by the metallic casing 2. The plastic tip 3 has a central axial bore 13 of a diameter gradually decreasing in the direction to its front terminal, thus three tubular sections are formed, i.e. a rear, a transition and a front section 12, 14 and 15, respectively. The rear section ends inside in an annular peripheral shoulder 8 forming an abutment for a weight attached to the conventional wire (not shown) serving for cleaning the tube from the reservoir or bladder, as is known in the art of India ink drawing stylus.

The transition section 14 tapers in the frontal direction and merges into the front section 15 as a continuously tubular structure having a diameter slightly greater than the external diameter of the ink tube 1.

As FIG. 1 shows, the front section 15 has an annular transition step 4 on its inside wall wherefrom it continues in a smaller diameter forward to the end. The ink tube 1 is displayed as having at its innermost end a flange-like terminal adapted to engage with the transition step 4 and includes in front of the flange-like terminal an annulus of smaller diameter so that a peripheral groove 10 is formed around the ink tube outer wall. The ink tube 1 has at its front end a suitably shaped writing point 6, preferably conical.

Following FIG. 1, the portion of the ink tube 1 having the smaller diameter is introduced loosely into the tip 3 by positioning the tip vertically to have said rear section 12 to open upwardly. The ink tube 1 is inserted in the direction of the arrow x and is permitted to fall down until its flange-like terminal engages the transition step 4. This occurs without using any pressure forcing the ink tube inside the tip bore 13, because the internal diameter of the bore exceeds the tube outer diameter. This may be facilitated by employing an aligning tool 5 which is seen as including a rear central bore having a section with a diameter such that it can engage the outside of the metallic casing 2. This central bore has another section having a diameter substantially corresponding to the outer diameter of the ink tube 1, so that, when said aligning tool 5 is set on said metallic casing 2, the bore section keeps the ink tube aligned along the central axis of the bore 13 and centered therein. The aligning tool 5 is thus capable of keeping the ink tube 1 in centered condition during the subsequent ultrasonic welding operation.

Figure 2:
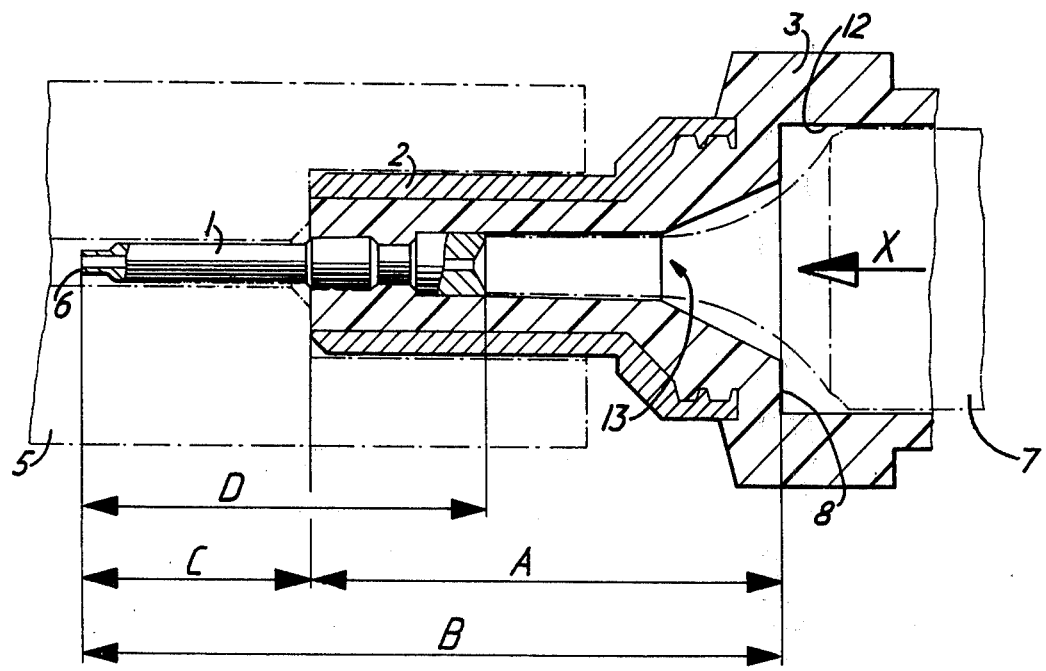
FIG. 2 is an enlarged view of a longitudinal section of the plastic tip of FIG. 1, wherein the ink tube is shown as being introduced according to the invention into the plastic tip in the x direction by means of an ultrasonic sonotrode.

FIG. 2 shows the ink tube 1 positioned inside the plastic tip 3 and a sonotrode 7 partially inserted in said rear section 12 of the bore 13, in abutment with the ink tube 1. The sonotrode 7 is the source of the ultrasonics used in the welding operation during which the plastic plastizes, allowing the ink tube to be shifted, forcing the larger diameter portion of the tube 1 to seat within the tip. By altering the depth of insertion of the sonotrode 7, the functionally important distance B between the writing point 6 and the annular peripheral shoulder 8 may be selectively altered. This distance B is important to insure that the cleaning wire attached to a control weight has a proper projection over the writing point 6, if the weight abuts shoulder 8.

In FIG. 2, the ink tube 1 is introduced into the tip bore 13 in the direction of the arrow x from the rear. The accurate distance that the small cleaning wire must protrude beyond the surface 6 of the small ink tube 1 is obtained by adjusting the distance B determined by the front edge of the ink tube 1 and the shoulder 8 accurately. The distance A between the front edge of the plastic tip 3 and the shoulder 8 is fixed during the formation of the tip 3, which is preferably formed by an injection molding process and, since the length of the ink tube D is also predetermined, the projection C of the free end of the tube beyond the front edge of the tip 3, plus the distance A is made to correspond to the distance B by adjusting the length of insertion of the sonotrode during the ultrasonic treatment. Measurement of either the length of the sonotrode or fixing the front portion of the ink tube in the auxiliary aligning tool 5 will suffice to limit the insertion.

Figure 3:
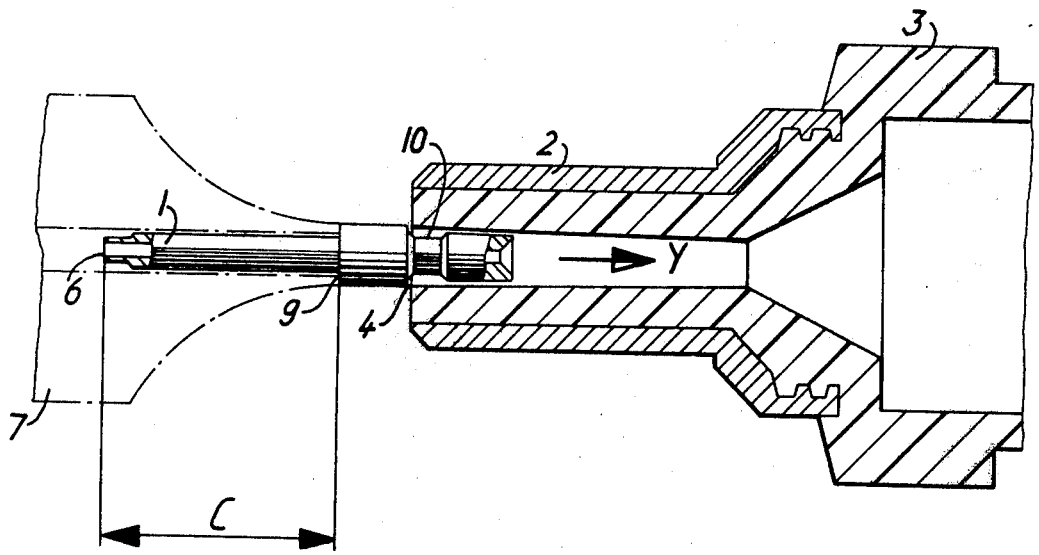
FIG. 3 is an enlarged view in partial longitudinal section of an ink tube introduced into a plastic tip according to the invention in the Y direction.

FIG. 3 shows another embodiment of the method according to the invention. Here, the ink tube 1 is freely inserted in the direction of the arrow Y from the front end of the plastic tip 3. For this operation, the sonotrode 7 is axially aligned with the plastic tip 3 and is provided with an axial bore receiving the front end of the ink tube 1. The sonotrode 7 engages a radial outward annular shoulder 9 formed on the ink tube 1 in front of the annulus 10. The sonotrode 7 acts here to align the ink tube 1 within the plastic tip in its place also serves as an abutment for the annular shoulder 9, at a distance from the writing point 6.

Figure 4:
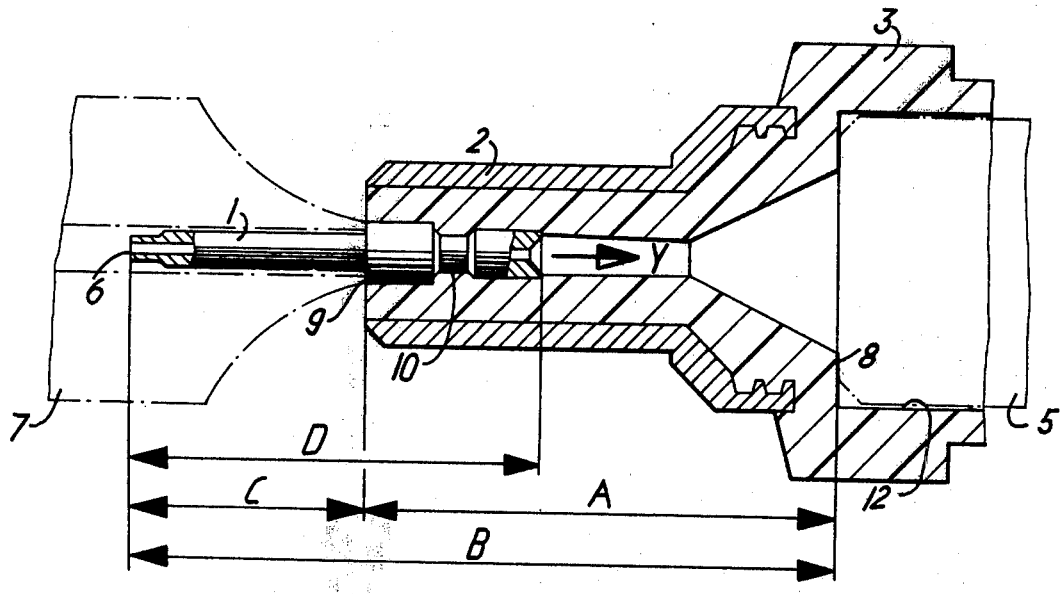
FIG. 4 is an enlarged view in a partial longitudinal section of a plastic tip with an ink tube introduced thereinto according to the invention in the Y direction by means of an ultrasonic sonotrode.

As illustrated in FIG. 4, the ink tube 1, shown in FIG. 3, is set in place in the plastic tip 3. The sonotrode 7 is positioned adjacent the flange-like portion of the ink tube 1. The sonotrode 7 encompasses in its axial bore the front end of the ink tube 1 for centering same and for causing ultrasonic welding between the ink tube 1 and the plastic tip 3.

Here, the desirable distance B determinative of the length of the cleaning wire beyond the writing point 6 is obtained by a correct setting of the from the tube shoulder 9 to tip shoulder 8 by matching this distance with the distance C distance A. Here an auxiliary aligning tool 5 is inserted into and engaged with the rear section 12 of the tip bore 13. The distance A is determined by selection of the distance between the front end of the sonotrode tool 7 and the auxiliary aligning tool 5 which engages the shoulder 8 of the bore section 12. In this arrangement, the spacial distances may be easily achieved in a way that the cleaning wire protrudes at proper distance through and outside the surface of the writing point 6.

Figure 5:
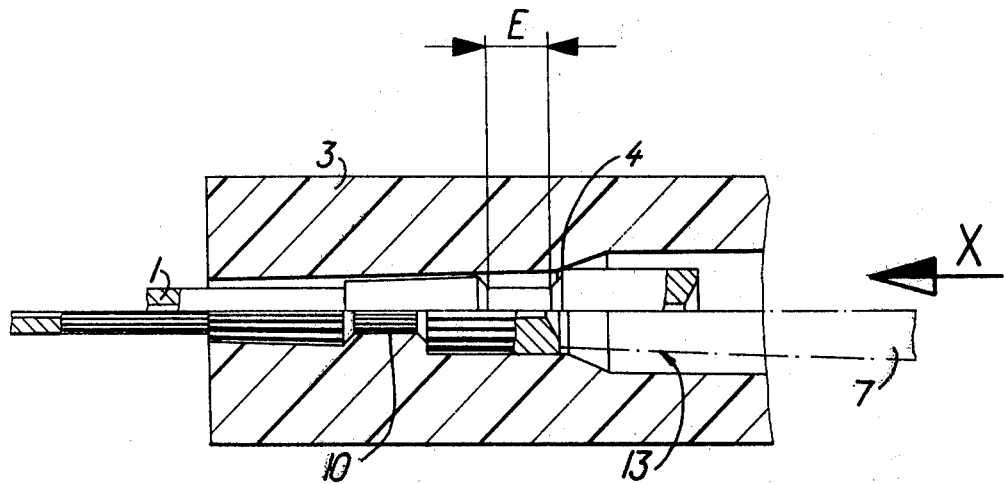
FIG. 5 is an enlarged view of a portion of the plastic tip displaying the bond of the ink tube, the introduction of the ink tube being made according to the invention in the "X" direction, the ink tube being displayed as longitudinally divided in two parts which respectively illustrate the ink tube in the position before and after the definite positioning thereof in the stylus tip.

FIG. 5 is illustrative of the ink tube 1 inside the bore 13 of a plastic tip 3 and the structure of the bore 13 so that an assembly apt for treatment is secured. The arrow X indicates that in this case the ink tube 1 is introduced from the right. The ink tube 1 is displayed in two sectional halves of which each makes apparent one of the ink tube positions in the course of its motion. The upper half in this sectional illustration shows the ink tube 1 position in the beginning of the mounting operation, while the other lower half in this sectional illustration shows the tube after assembly. Here, the ultrasonic energy emanating from the sonotrode 7 is oscillatingly transmitted in an axial direction defined by the portions of the ink tube 1 which engage the transition step inside the axial bore 13 of the plastic tip 3. The frequency of the ultrasonic energy may be in the range of between 20 KHz and 45 KHz. The ultrasonic energy reaches the space of the transition step and plasticizes and liquifies the plastic material in the zone of its impact during this process, the ink tube 1 is shifted at a low exertion of force only in the direction of the arrow X and placed in the correct writing position. The plasticized and molten plastic material inside the bore 13 yields to such movement and is distributed in the annular groove 10.

The dimensions of the ink tube 1, i.e., groove width E, inner grove diameter $\phi F$, tube diameters $\phi G$, H adjacent to the groove as well as the diameter of the bore 13 and the extent of sonotrode displacement during the welding and mounting operation are selected, assimilated and mutually matched in a manner such that the volume of the displaced molten plastic material from the plastic tip 3 and the free space within said annular groove 10 are in a ratio of about 1:0.8. Any excess molten plastic material flows outside said groove and serves to compensate the production tolerances.

Preferably a surplus of 10 to 30% is desired in the material mass of the transition zone determined by the step 4 so that on melting the material will completely fill the annular groove 10. The ultrasonic treatment is maintained for a time sufficient to cause the material to liquify and flow and thereafter stopped. The material is then allowed to cool under ambient conditions or by application of a cooling medium. The molten material as seen in the Figures surrounds the annular groove 10 in a firm intergral bond.

The ultrasonic welding by which the ink tube 1 is mounted within the tip 3 creates a bond which is substantially stronger and tighter than that achievable in the practice of the methods known hitherto. Said bond therefore provides an interconnection of an excellent mechanical strength.

Figure 6:
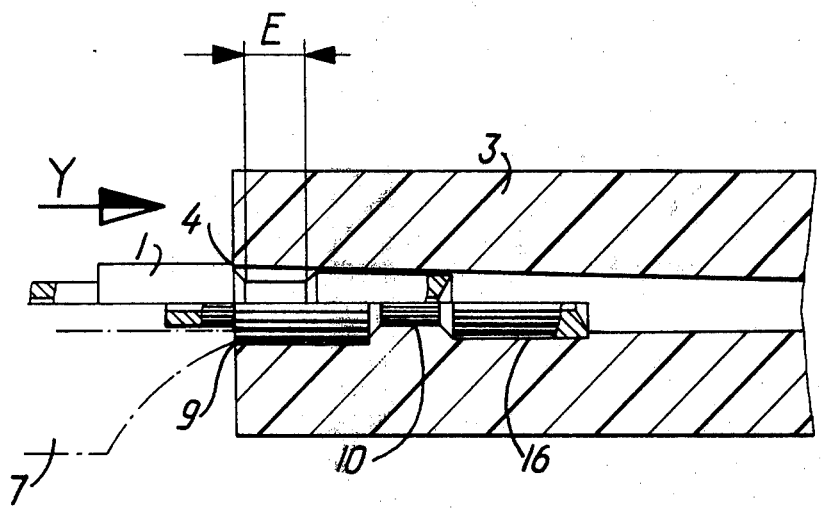
FIG. 6 is an enlarged view in longitudinal section of another portion of the tube displaying the bond of the ink tube within the stylus plastic tip, the introduction of the ink tube being made according to the invention in the Y direction, whereby the ink tube is illustrated as longitudinally divided in two parts which respectively show the ink tube in its position before and after the definite positioning in the stylus plastic tip.

FIG. 6 shows another example of the performance of the method according to the present invention. Here, the ink tube 1 is introduced into the bore 13 in the direction Y. The tube dimensions and the amount of plastic material displaced are necessarily selected and matched identically with those described in connection with FIG. 5. Also in this example, the ink tube 1 is shown as longitudinally sectioned, the upper portion being illustrative of the ink tube position at the beginning of its mounting and the lower portion showing the ink tube after its shift to the correct writing position.

In this example, the sonotrode 7 transmits the ultrasonic heating and welding energy onto the ink tube 1 across its annular shoulder 9. The sonotrode 7, being provided also in this example with the axial bore shown in FIGS. 3 and 4, is capable of centering and aligning the ink tube 1 for the welding operation.

The mounting of the ink tube 1 in the plastic tip 3 by ultrasonic welding process proves to have a great deal of advantage both in operation and in result. This mounting provides optimum mechanical strength of the bond and the operation of the method is rationally and speedily carried so that the operational cost is extremely low. Besides, where use is made of appropriate feeding means, the method according to the invention may be fully automated.

As seen in FIG. 6, the small tube has parts which are at least partially concial. Also the end of the small tube acting as a mounting portion is provided with a conically shaped portion 16 of maximum diameter $\phi H$ and after the peripheral groove 10 a part is provided whose diameter $\phi G$ is greater than the maximum diameter $\phi H$ of the conical section.

It will be seen from the foregoing that the advantages enumerated above, i.e., the stress free, permanent and secure bond between the ink tube and the plastic writing tip are successfully obtained. The method allows the insertion of the tube from both front and rear ends of the tip and does not require mechanical compression, or the use of intermediate sleeves or the like. The spatial distances of the tube, the tip etc. are accurately and precisely determined.

Various changes, modifications and embodiments are disclosed herein, others will be obvious to those skilled in this art. Accordingly, the present disclosure is to be taken as illustrative only and not limiting of the scope of the present invention.

What we claim is:

1. In the manufacture of writing instruments, the method of mounting and fastening a non-plastic ink tube in the bore of a plastic tip, comprising the steps of: providing said bore with a radially inward tapering surface forming an annular contact area with said tip, introducing the ink tube at least partially into the bore of said plastic tip, centering the ink tube within said bore, subjecting said ink tube and said plastic tip to ultransonic treatment at least in the area of contact with one another to cause said plastic tip to soften and to partially melt about the periphery of said ink tube and thereafter stopping the ultrasonic treatment to cause said molten plastic material to set about the entire circumference of said ink tube.

2. The method of claim 1, including the step of providing an annular peripheral groove about said ink tube for receiving the molten material.

3. The method of claim 2, wherein the volume of said peripheral groove is selected by sizing said groove in a manner such that, in regard to this volume, there is a surplus of the material mass in the contact surfaces of the plastic tip ranging from 10 to 30%.

4. In the manufacture of writing instruments, the method of mounting and fastening a non-plastic ink tube in the bore of a plastic tip, comprising the steps of: providing the ink tube on its rear end with a thickened flange-like terminal, introducing the ink tube into the bore of the plastic tip in the direction toward the writing end of the plastic tip so that said flange is in contact with said bore, placing adjacent said flange-like terminal a sonotrode to radiate ultrasonic energy across said flange-like terminal toward the area of contact between said plastic tip and said ink tube, subjecting said ink tube and said plastic tip to ultrasonic treatment to cause said plastic tip to soften and to partially melt about the periphery of said flange-like terminal and thereafter stopping the ultrasonic treatment to cause said molten plastic material to set about the entire circumference of said flange-like terminal.

5. The method of claim 4, wherein the step is taken for adjusting the sonotrode to radiate the ultrasonic energy at the frequency of between 20 KHz and 45 kHz.

6. The method of claim 6, wherein the centering of said ink tube inside said plastic tip is made by the step of providing an auxiliary aligning tool alignable with said plastic tip and having a central bore whose diameter substantially corresponds to that of said ink tube, inserting one end of said ink tube into said auxiliary aligning tool and inserting said ink tube by its free end into the axial bore of said plastic tip to have it centered therein.

7. In the manufacture of writing instruments, the method of mounting and fastening a non-plastic ink tube in the bore of a plastic tip, comprising the steps of: providing on the ink tube in its front most area an annular shoulder, placing the front section of said ink tube into a sonotrode, contacting said sonotrode with said annular shoulder, indroducing the free end of the ink tube into the bore of the plastic tip in the direction from the front end of this plastic tip to have the ink tube centered inside said plastic tip for the ultrasonic treatment, subjecting said ink tube and said plastic tip to ultrasonic treatment to cause said plastic tip to soften and to partially melt about the periphery of said flange-like terminal and thereafter stopping the ultrasonic treatment to cause said molten plastic material to set about the entire circumference of said annular shoulder.

8. The method of claim 7, wherein the step is taken of adjusting the sonotrode to radiate the ultrasonic energy at the frequency within the range of between 20 kHz and 45 kHz.

9. The method of claim 1, including the step of predetermining the distance the writing surface of said ink tube protrudes from the tip.

10. In the manufacture of writing instruments, the method of mounting and fastening a non-plastic ink rube in the bore of a plastic tip wherein the tip includes a portion for supporting a gavity controlled cleaning wire, comprising the steps of: introducing the ink tube at least partially into the bore of said plastic tip, centering the ink tube within said bore, subjecting said ink tube and said plastic tip to ultrasonic treatment at least in the area of contact with one another to cause said plastic tip to soften and to partially melt about the periphery of said ink tube, positioning said ink tube inside said plastic tip by shifting said ink tube a distance between said tip and said tube into the operative writing position and said distance being determined between the writing surface of said ink tube and said supporting portion and thereafter stopping the ultrasonic treatment to cause said molten plastic material to set about the entire circumference of said ink tube.

11. The method of claim 2, wherein the end of the ink tube acting as a mounting portion is provided with a conically shaped portion, an adjacent peripheral groove and located after the peripheral groove a part whose diameter is greater than the maximum diameter of the conical section.

12. A writing instrument having a plastic tip with an axial bore and an ink tube therein and welded thereto, said instrument comprising an injection molded plastic tip with an annular peripheral supporting portion within its bore, a cleaning wire shiftable within the ink tube, attached to a controlling weight and protruding, at a given weight position, beyond the writing surface of the ink tube, said ink tube after insertion and centering within the plastic tip being fixed thereto by an ultrasonic treatment, the plastic material of a contact area of tip and tube softened and partially melted thereby facilitating a further axial insertion of the ink tube to a predetermined position with a low exertion of force only and the plastic material after the ultrasonic treatment solidifying and keeping the ink tube fixedly in its position.

13. In the manufacture of writing instruments, the method of mounting and fastening a non-plastic ink tube in the bore of a plastic tip, comprising the steps of: providing said ink tube with a first axial portion having a diameter less than the bore of said plastic tip and a second axial portion having a diameter greater than the bore of said plastic tip, initially inserting said first portion of lesser diameter within the bore of said plastic tip until said portion of greater diameter is in contact with said plastic tip, thereafter subjecting said tube and said plastic tip to ultrasonic treatment to cause said plastic tip to soften and while said plastic material is in molten condition axially positioning said ink tube so that said second portion having a greater diameter lies within said bore and thereafter stopping the ultrasonic treatment to cause said molten plastic material to set about the circumference of said ink tube.

14. The method according to claim 1 including the step of applying said ultrasonic treatment directly through said ink tube.

* * * * *